United States Patent [19]
Tanaka et al.

[11] Patent Number: 5,466,538
[45] Date of Patent: Nov. 14, 1995

[54] MULTI-LAYER SLIDING MEMBER

[75] Inventors: Tadashi Tanaka; Masaaki Sakamoto; Tohru Kato, all of Nagoya, Japan

[73] Assignee: Daido Metal Company Ltd., Nagoya, Japan

[21] Appl. No.: 337,488

[22] Filed: Nov. 8, 1994

[30] Foreign Application Priority Data

Dec. 28, 1993 [JP] Japan .................. 5-336531

[51] Int. Cl.$^6$ .................................. F16C 33/12
[52] U.S. Cl. .................. 428/610; 428/673; 428/675; 428/681; 428/685; 428/941; 384/912
[58] Field of Search .................. 428/610, 675, 428/674, 658, 673, 941, 676, 681, 685; 384/912

[56] References Cited

U.S. PATENT DOCUMENTS

| | | | |
|---|---|---|---|
| 2,145,248 | 1/1939 | Chace | 428/941 |
| 2,359,361 | 10/1944 | Gleszer et al. | 428/673 |
| 2,765,520 | 10/1956 | Donley | 428/673 |
| 3,537,881 | 11/1970 | Corwin | 428/674 |
| 4,892,141 | 1/1990 | Shiga et al. | 428/941 |
| 5,063,117 | 11/1991 | Suda et al. | 428/674 |

FOREIGN PATENT DOCUMENTS

| | | |
|---|---|---|
| 538568 | 2/1993 | Japan . |
| 538567 | 2/1993 | Japan . |
| 592261 | 4/1993 | Japan . |

Primary Examiner—John Zimmerman
Attorney, Agent, or Firm—Browdy and Neimark

[57] ABSTRACT

There is disclosed a multi-layer sliding member having a back metal and a Cu—Zn-based alloy layer bonded to the back metal with a sufficiently high bonding strength. A method of producing such a sliding member is also disclosed. The multi-layer includes a back metal, a brazing material bonded to the back metal, a diffusion mixture layer bonded to the brazing material, and a Cu—Zn-based alloy layer bonded to the diffusion mixture layer. The diffusion mixture layer is a layer in which not less than 10 wt. % Ni, components of the Cu—Zn-based alloy and components of the brazing material are mixed with one another. The diffusion mixture layer has a thickness of 5–300 μm.

8 Claims, 2 Drawing Sheets

MULTI-LAYER SLIDING MEMBER

BACKGROUND OF THE INVENTION

This invention relates to a multi-layer sliding member having a back metal and a Cu—Zn-based alloy layer bonded together by a brazing (soldering) material (intermediate bonding layer), and also relates to a method of producing such a sliding member.

A casting method by use of gravity casting and a brazing method are commonly known as a conventional method of producing a multi-layer sliding member having a Cu—Zn-based alloy layer.

In a casting method by use of gravity, a solid-liquid coexistent temperature range available when casting a Cu—Zn-based alloy is narrow, and as compared with a Cu—Sn-based alloy and a Cu—Sn—Pb alloy, a casting defect such as a cavity (blow hole) and a crack is liable to develop in the cast Cu—Zn-based alloy. Another problem is that it is difficult to bond this alloy to a back metal in a stably manner, and therefore the kinds of alloys to be cast are limited. In a brazing method, an oxide film (passive film) of zinc on a Cu—Zn-based alloy adversely affects the wettability with a brazing material, and besides vapor of zinc occurs at high temperatures, so that an adequate bonding strength can not be obtained. Thus, it has been thought difficult to braze a Cu—Zn-based alloy.

In the conventional brazing method and a multi-layer sliding member produced by this method, there have been encountered problems that the wettability between the Cu—Zn-based alloy and the brazing material is poor, and that a defect, such as a blow hole and separation, develops, so that the bonding strength is very low.

SUMMARY OF THE INVENTION

It is an object of this invention to overcome the above problems, and more specifically to provide a multi-layer sliding member in which the wettability between a Cu—Zn-based alloy and a brazing material is improved, and the occurrence of zinc vapor is minimized at high temperatures, thereby eliminating a defect such as separation and a blow hole, and the resultant sliding member has an excellent bonding strength.

Another object of the invention is to provide a method of producing such a multi-layer sliding member.

According to the present invention, there is provided a multi-layer sliding member of the brazed type comprising a back metal, a brazing material layer bonded to the back metal, and a Cu—Zn-based alloy layer, in which a diffusion mixture layer is formed between the Cu—Zn-based alloy layer and the brazing material layer, said diffusion mixture layer being a layer in which Ni, components of the Cu—Zn-based alloy and components of the brazing material are diffused to and mixed with one another. The diffusion mixture layer has a Ni content of not less than 10%, and has a thickness of 5~300 μm.

In a method of producing a multi-layer sliding member having a back metal and a Cu—Zn-based alloy layer, the surface of the Cu—Zn-based alloy layer facing (directed toward) the back metal is beforehand plated electrically with Ni (as shown in FIG. 5), and then the Cu—Zn-based alloy layer is bonded to the back metal through a brazing material interposed between the back metal and the plated Ni layer, by heating them up to a temperature not less than the melting-commencement temperature of the brazing material under a pressure of 0.05 to 200 kgf/cm². Further, in order to obtain a more stable bonding, the surface of the back metal facing the Cu—Zn-based alloy layer may optionally be plated with Ni. Preferably, each of the Ni-plating films formed respectively on the Cu—Zn-based alloy and the back metal has a thickness of 0.5~20 μm. Preferably, the Zn content of the Cu—Zn-based alloy layer is 4~40 wt. %. Preferably, a brazing material is silver solder. Preferably, the back metal is made of one of carbon steel, alloy steel, stainless steel, cast iron, cast steel and forged steel.

In the multi-layer sliding member of the present invention, the diffusion mixture layer exists between the Cu—Zn-based alloy layer and the brazing material. The diffusion mixture layer is a layer containing not less than 10 wt. % Ni, and the components of the Cu—Zn-based alloy and components of the brazing material and Ni are mixed together. This diffusion mixture layer has a thickness of 5~300 μm. With this construction, the strength of the diffusion mixture layer is increased, thereby achieving an advantageous effect that the bonding strength by brazing is increased. If the thickness of the diffusion mixture layer is less than 5 μm, the bonding strength is low and unsatisfactory. In contrast, if the thickness of the diffusion mixture layer is more than 300 μm, the effect of increasing the bonding strength is not enhanced while the cost is increased. Therefore, the thickness of the diffusion mixture layer should be 5~300 μm. If the Ni content of the diffusion mixture layer is less than 10%, the bonding strength is low, and therefore the Ni content of the diffusion mixture layer should be not less than 10%.

In the method of the present invention in which the back metal and the Cu—Zn-based alloy layer are bonded together by brazing, the Ni-plating film is beforehand formed on that surface of the Cu—Zn-based alloy layer to be bonded to the back metal, and the brazing material having a thickness of 0.05 to 0.5 mm is interposed between the bonding surface of the back metal and the bonding surface of the Cu—Zn-based alloy layer, and then the back metal and the Cu—Zn-based alloy layer are brazed together under a heating and pressurizing condition, thereby providing the multi-layer sliding member having an excellent bonding strength.

The reasons for specifying the method of the present invention will be described in the following:

(1) Thickness of Ni-plating film: 0.5~20 μm

The Ni-plating film, formed on the Cu—Zn-based alloy layer, eliminate adverse effects of an oxide film of the Cu—Zn-based alloy (which adversely affect the wettability) to enhance the wettability with the brazing material, and also minimizes the occurrence of vapor of zinc at high temperatures to thereby enhance the strength of intimate bonding contact. When the Ni-plating is applied to the back metal, the wettability with the brazing material is further enhanced, so that the bonding of the back metal to the Cu—Zn-based alloy can be made more stable. If the thickness of the Ni-plating film is less than 0.5 μm, the above effects can not be obtained, and if this thickness is more than 20 μm, the above effects are not further enhanced, but a longer time is required for the plating operation, and hence the cost is increased.

More preferably, this thickness is 2~15 μm.

(2) Zinc content of Cu—Zn-based alloy: 4~40 wt. %

A Cu—Zn-based alloy layer (serving as a sliding layer), having a Zn content of less than 4%, can be easily bonded without the need for a Ni-plating film, but is inferior in sliding property. If the Zn content is more than 40%, a brittle γ-phase compound crystallizes, and the alloy layer is not suited for practical use as a sliding material.

(3) Brazing material: Silver solder (BAg type)

Silver solder causes Ni to be easily diffused thereinto, and is excellent in bonding properties, and besides is relatively low in melting point, and hence is excellent in operability. Silver solder is also excellent in bonding with the back metal (carbon steel, alloy steel, stainless steel and etc.)

DESCRIPTION OF THE PREFERRED EMBODIMENTS

Figure 1:
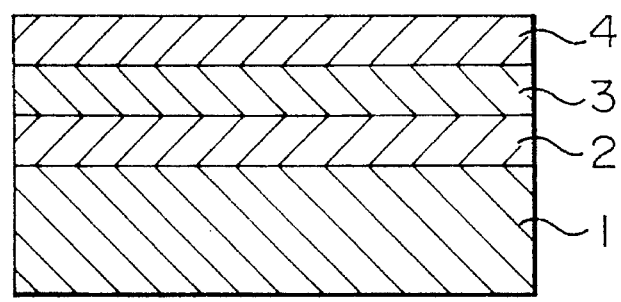
FIG. 1 is a view showing a cross-section of a multi-layer sliding member of the present invention.
Figure 6:
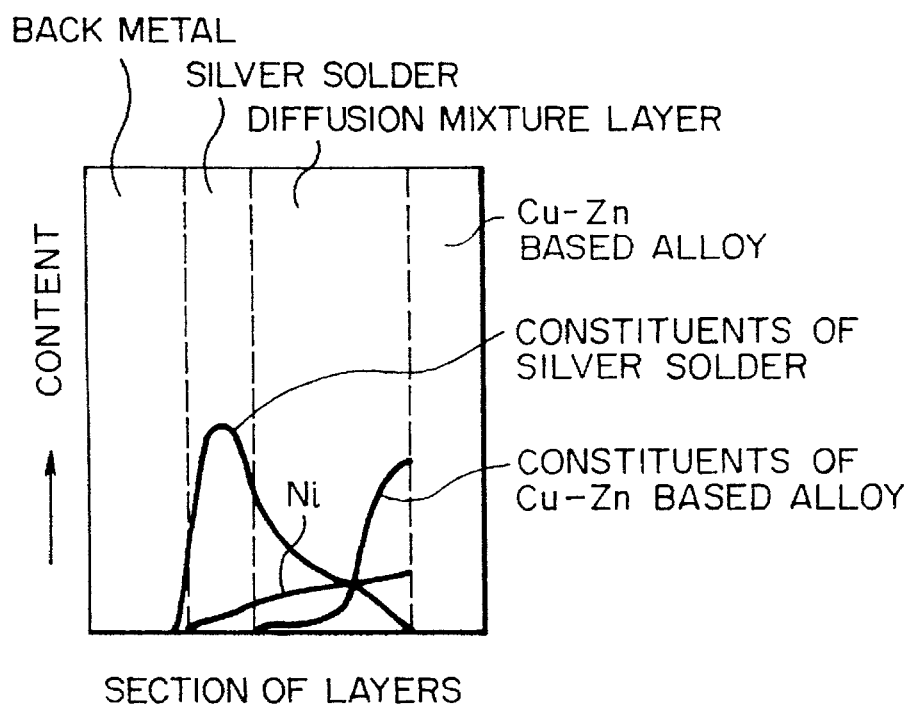
FIG. 6 is a graph showing the change of content regarding each of elements contained in diffusion mixture layer.

First, a back metal 1 having a predetermined thickness, a brazing material 2 having a thickness of 0.2 mm and Ni-plated (6) Cu—Zn-based alloy 4 having a thickness of 5 mm were superposed in such a manner that a Ni-plated surface of the alloy was in contact with a surface of the brazing material, and a pressure-applying weight was placed on that surface of the Cu—Zn-based alloy facing away from the brazing material, and the multi-layer materials were held in a furnace for one hour at 730° C., thereby producing a multi-layer sliding member of the present invention shown in FIG. 1. FIG. 1 shows a cross-section of the multi-layer sliding member comprising the back metal 1, the brazing material 2, a diffusion mixture layer 3, and a Cu—Zn-based alloy layer 4. The change of Ni content and etc. in the diffusion mixture layer formed in the production step is shown in FIG. 6.

In order to examine the strength of bonding between the Cu—Zn-based alloy layer and the back metal of the multi-layer sliding member of the present invention, the following test pieces, corresponding to the multi-layer sliding member of the invention, were prepared. More specifically, the back metals of a column shape having an outer diameter of 38 mm and a height of 40 mm were prepared by machining S10C (carbon steel for a mechanical structure), SCM435 (alloy steel for mechanical structure), FCD500 (nodular graphite cast iron) and SUS304 (stainless steel) (which are provided according to JIS (Japanese Industrial Standards)). Ni was plated on a axially terminal end surface of each of some back metal samples to be bonded to the alloy. The Cu—Zn-based alloy was formed into a column shape having an outer diameter of 38 mm and a height of 5 mm, and then Ni was plated on a front surface of this alloy to be bonded through a brazing material to the back metal. Table 1 shows the composition of the back metal samples, and Table 2 show the composition of the alloy samples. As the brazing material serving as a bonding material, a sheet of BAg-2 having a thickness of 0.2 mm was used, and the composition thereof is shown in Table 3.

Figure 2:
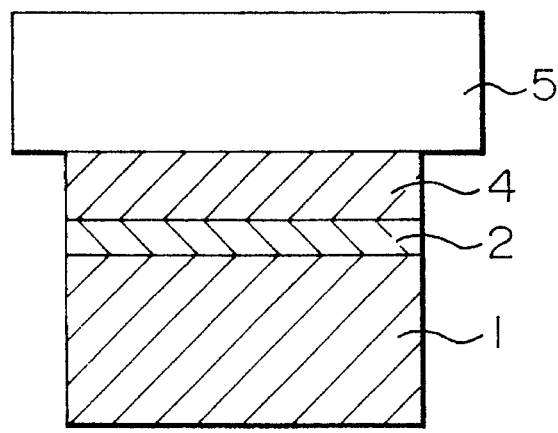
FIG. 2 is a view showing layers of the multi-layer sliding member of the invention in a state assembled with another member.

The columnar back metal 1, the columner brazing material 2, the columner alloy material 4 and the pressure-applying weight 5 (1 kg) axially aligned to each other were set as shown in FIG. 2, and this assembly was introduced into a furnace, and was heated to a predetermined temperature and held there (730° C.×1 hour), and then was pressurized by a press under a compression stress of 100 kgf/cm² at a high temperature state.

Figure 3:
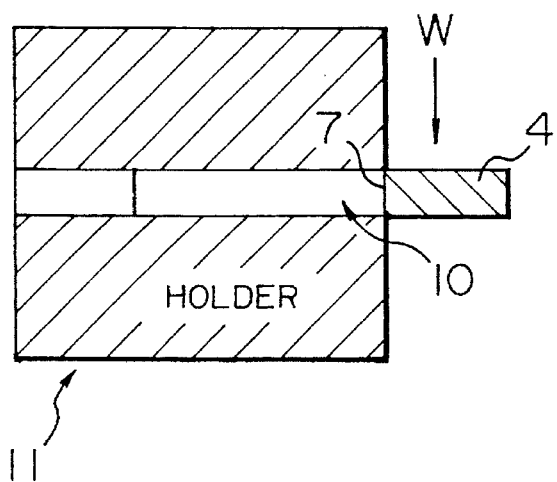
FIG. 3 is a view showing a condition of a bonding strength test for the multi-layer sliding member of the invention.
Figure 4:
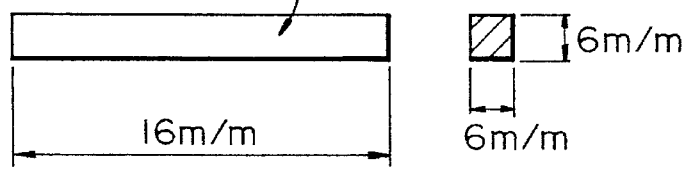
FIG. 4 is a view showing the shape of a test piece used in the bonding strength test of FIG. 3.
Figure 5:
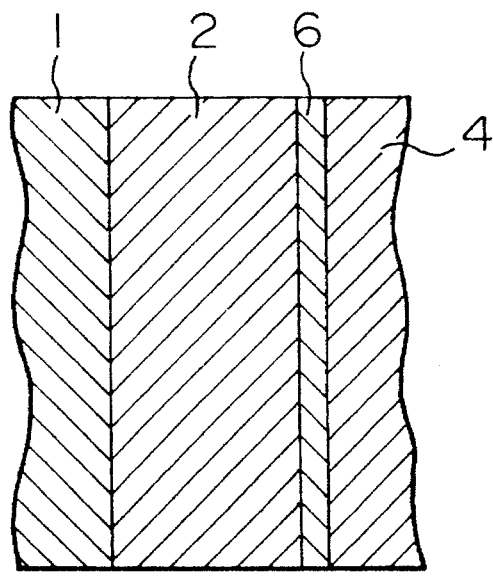
FIG. 5 is a view showing a cross-section of the layers of the multi-layer sliding member before it is subjected to a production process.

Thereafter, the outer diameter of the resultant structure was finished by machining, and the bonding interface was subjected to ultrasonic flow detection, and the outer peripheral cut surface was subjected to dyeing flow detection, and the bonded condition was confirmed. Then, a test piece 10 (shown in FIG. 4) having a length of 16 mm was prepared from this sample, and in a test jig 11 shown in FIG. 3, a load (W) was applied to the test piece in a direction parallel to a bonding plane 7, and a shear bonding strength was measured. The structure of the cut surface was observed by a microscope, and the thickness of the diffusion mixture layer was measured. Table 4 shows the products of the present invention prepared according to this embodiment, and Table 5 shows conditions of production of comparative products as well as results, and FIG. 2 shows the assembled condition.

The Ni-plating, the copper alloy, the back metal, the heating method, and the pressurizing method are not limited to those described in the above embodiment.

In the method of the invention in which brazing is used, Ni plating is applied on the surface of Cu—Zn alloy which surface is directed toward (or facing) the back metal through the brazing material, with the results that wettability between the Cu—Zn alloy and the brazing material is improved, that it becomes possible to prevent zinc vapour from occurring at a high temperature, and that it becomes possible to effect the bonding of the Cu—Zn alloy layer which bonding had been deemed to be impossible in prior art. In the multi-layer sliding member of the invention, the diffusion mixture layer exists between the Cu—Zn alloy layer and the brazing material, which diffusion mixture layer is one in which Ni not less than 10 wt. %, the constituents of the Cu—Zn alloy layer and the constituents of the brazing material are mixed and which has a thickness of 5 to 300 μm, with the result that the strength of the diffusion mixture layer increases to thereby make the bonding force of the brazing bonding increase.

[TABLE 1]

| | COMPOSITION OF BACK METAL | | | | | | |
|---|---|---|---|---|---|---|---|
| | CHEMICAL COMPOSITION wt. % | | | | | | |
| MATERIAL | C | Si | Mn | P | S | Cr | OTHERS |
| S10C | 0.08–0.13 | 0.15–0.35 | 0.30–0.60 | not more than 0.030 | not more than 0.035 | — | — |
| SCM435 | 0.33–0.38 | 0.15–0.35 | 0.60–0.85 | not more | not more | 0.90–1.20 | 0.15–0.30 Mo |

[TABLE 1]-continued

| | COMPOSITION OF BACK METAL | | | | | | |
|---|---|---|---|---|---|---|---|
| | CHEMICAL COMPOSITION wt. % | | | | | | |
| MATERIAL | C | Si | Mn | P | S | Cr | OTHERS |
| FCD500 | not less than 2.5 | — | — | than 0.030 | than 0.030 not more than 0.02 | — | — |
| SUS304 | not more than 0.08 | not more than 1.00 | not more than 2.00 | not more than 0.045 | not more than 0.030 | 18.0–20.0 | 8.0–10.5 Ni |

[TABLE 2]

| | COMPOSITION OF ALLOY | | | | | |
|---|---|---|---|---|---|---|
| | CHEMICAL COMPOSITION wt. % | | | | | |
| MATERIAL | Cu | Pb | Mn | Si | Al | Zn |
| A | 58 | 3.0 | 2.5 | 1.2 | 3.0 | Balance |
| B | 69 | 6.0 | 2.5 | 1.0 | — | Balance |

[TABLE 3]

| | CHEMICAL COMPOSITION OF BRAZING MATERIAL | | | | | |
|---|---|---|---|---|---|---|
| SIGN OF MA-TERIAL | CHEMCIAL COMPOSITION wt. % | | | | | |
| | Ag | Cu | Zn | Cd | Ni | Sn |
| BAg-2 | 34.0–36.0 | 25.0–27.0 | 19.0–23.0 | 17–19 | — | — |

[TABLE 4]

| | BRAZING CONDITIONS AND EXAMINATION RESULTS | | | | | |
|---|---|---|---|---|---|---|
| No. | KIND OF BACK METAL | KIND OF ALLOY | Ni-PLATING | ULTRASONIC FLOW DETECTION AND DYEING FLOW DETECTION | THICKNESS OF DIFFUSION MIXTURE LAYER μm | BONDING STRENGTH N/mm² |
| 1 | S10C | A | Only alloy 0.5 μm | No defect | 6 | 280 |
| 2 | S10C | B | Only alloy 10 μm | No defect | 150 | 200 |
| 3 | S10C | A | Only alloy 15 μm | No defect | 180 | 287 |
| 4 | S10C | B | Only alloy 20 μm | No defect | 300 | 205 |
| 5 | S10C | B | Alloy & back metal 0.5 μm | No defect | 8 | 210 |
| 6 | S10C | A | Alloy & back metal 10 μm | No defect | 120 | 293 |
| 7 | S10C | B | Alloy & back metal 15 μm | No defect | 225 | 208 |
| PRODUCTS OF INVENTION | | | | | | |
| 8 | S10C | A | Alloy & back metal 20 μm | No defect | 240 | 296 |
| 9 | SCM435 | B | Only alloy 0.5 μm | No defect | 8 | 195 |
| 10 | SCM435 | A | Only alloy 10 μm | No defect | 120 | 287 |
| 11 | SCM435 | B | Only alloy | No defect | 225 | 198 |

[TABLE 4]-continued

BRAZING CONDITIONS AND EXAMINATION RESULTS

| No. | KIND OF BACK METAL | KIND OF ALLOY | Ni-PLATING | ULTRASONIC FLOW DETECTION AND DYEING FLOW DETECTION | THICKNESS OF DIFFUSION MIXTURE LAYER μm | BONDING STRENGTH N/mm² |
|---|---|---|---|---|---|---|
| 12 | SCM435 | A | 15 μm Only alloy | No defect | 240 | 287 |
| 13 | SCM435 | A | 20 μm Alloy & back metal | No defect | 6 | 282 |
| 14 | SCM435 | B | 0.5 μm Alloy & back metal | No defect | 150 | 200 |
| 15 | SCM435 | A | 10 μm Alloy & back metal | No defect | 180 | 291 |
| 16 | SCM435 | B | 15 μm Alloy & back metal | No defect | 300 | 203 |
| 17 | FCD500 | A | 20 μm Only alloy | No defect | 6 | 280 |
| 18 | FCD500 | A | 0.5 μm Only alloy | No defect | 120 | 283 |
| 19 | FCD500 | B | 10 μm Only alloy | No defect | 225 | 180 |
| 20 | FCD500 | B | 15 μm Only alloy | No defect | 300 | 183 |
| 21 | FCD500 | A | 20 μm Alloy & back metal | No defect | 6 | 282 |
| 22 | FCD500 | A | 0.5 μm Alloy & back metal | No defect | 120 | 285 |
| 23 | FCD500 | B | 10 μm Alloy & back metal | No defect | 225 | 185 |
| 24 | FCD500 | B | 15 μm Alloy & back metal | No defect | 300 | 184 |
| 25 | SUS304 | A | 20 μm Only alloy | No defect | 120 | 293 |
| 26 | SUS304 | B | 10 μm Alloy & back metal 0.5 μm | No defect | 8 | 200 |

[TABLE 5]

BRAZING CONDITIONS AND EXAMINATION RESULTS

| No. | KIND OF BACK METAL | KIND OF ALLOY | Ni-PLATING | ULTRASONIC FLOW DETECTION AND DYEING FLOW DETECTION | THICKNESS OF DIFFUSION MIXTURE LAYER μm | BONDING STRENGTH N/mm² |
|---|---|---|---|---|---|---|
| 1 | S10C | A | None | Defect | 0 | 25 |
| 2 | S10C | A | Only alloy 0.3 μm | Defect | 3 | 30 |
| 3 | S10C | A | Alloy & back metal 0.3 μm | Defect | 3 | 30 |
| 4 | S10C | A | Only back metal 15 μm | Defect | 0 | 30 |
| 5 | S10C | B | None | Defect | 0 | 15 |
| 6 | S10C | B | Only alloy 0.3 μm | Defect | 4 | 17 |
| 7 | S10C | B | Alloy & back metal 0.3 μm | Defect | 4 | 17 |
| COMPARATIVE PRODUCTS | | | | | | |
| 8 | S10C | B | Only back metal 15 μm | Defect | 0 | 18 |

[TABLE 5]-continued

BRAZING CONDITIONS AND EXAMINATION RESULTS

| No. | KIND OF BACK METAL | KIND OF ALLOY | Ni-PLATING | ULTRASONIC FLOW DETECTION AND DYEING FLOW DETECTION | THICKNESS OF DIFFUSION MIXTURE LAYER μm | BONDING STRENGTH N/mm² |
| --- | --- | --- | --- | --- | --- | --- |
| 9 | SCM435 | A | None | Defect | 0 | 24 |
| 10 | SCM435 | A | Only alloy 0.3 μm | Defect | 3 | 29 |
| 11 | SCM435 | A | Alloy & back metal 0.3 μm | Defect | 3 | 28 |
| 12 | SCM435 | A | Only back metal 15 μm | Defect | 0 | 29 |
| 13 | SCM435 | B | None | Defect | 0 | 15 |
| 14 | SCM435 | B | Only alloy 0.3 μm | Defect | 4 | 18 |
| 15 | SCM435 | B | Alloy & metal 15 μm | Defect | 4 | 18 |
| 16 | SCM435 | B | Only back metal 15 μm | Defect | 0 | 18 |
| 17 | FCD500 | A | None | Defect | 0 | 12 |
| 18 | FCD500 | A | Only alloy 0.3 μm | Defect | 3 | 13 |
| 19 | FCD500 | A | Alloy & back metal 0.3 μm | Defect | 3 | 13 |
| 20 | FCD500 | A | Only back metal 15 μm | Defect | 0 | 13 |
| 21 | FCD500 | B | None | Defect | 0 | 10 |
| 22 | FCD500 | B | Only alloy 0.3 μm | Defect | 4 | 10 |
| 23 | FCD500 | B | Alloy & Back metal 0.3 μm | Defect | 4 | 10 |
| 24 | FCD500 | B | Only back metal 15 μm | Defect | 0 | 10 |
| 25 | SUS304 | A | Only alloy 0.3 μm | Defect | 3 | 15 |
| 26 | SUS304 | B | Alloy & 0.3 μm | Defect | 4 | 17 |

What is claimed is:

1. A multi-layer sliding member comprising a back metal, a brazing material bonded to said back metal, a diffusion mixture layer bonded to said brazing material, and a sliding layer of a Cu—Zn-based alloy bonded to said diffusion mixture layer;

said diffusion mixture layer being a layer in which Ni not less than 10 wt %, components of said Cu—Zn-based alloy sliding layer and components of said brazing material are diffused to and mixed with one another, said diffusion mixture layer having a thickness of 5~300 μm.

2. A sliding member according to claim 1, in which said back metal is selected from the group consisting of steel and iron.

3. A sliding member according to claim 2, wherein said back metal is selected from the group consisting of carbon steel and alloy steel.

4. A sliding member according to claim 2, wherein said back metal is stainless steel.

5. A sliding member according to claim 2, wherein said back metal is selected from the group consisting of cast iron, cast steel and forged steel.

6. A sliding member according to claim 1, in which said brazing material consists, by weight, of 34.0~36.0% Ag, 25.0~27.0% Cu, 19.0~23.0% Zn, 17~19% Cd and incidental impurities.

7. A sliding member according to claim 1, in which a Ni-plating film, having a thickness of 0.5~20 μm, is formed between said back metal and said brazing material.

8. A sliding member according to claim 1, in which the Zn content of said Cu—Zn-based alloy sliding layer is 4~40 wt. %.

* * * * *